United States Patent [19]

Siegele et al.

[11] 3,875,104

[45] Apr. 1, 1975

[54] COAGULATION OF OIL-EXTENDED EMULSIONS

[75] Inventors: Frederick H. Siegele, Westport; Robert Rabinowitz, Stamford, both of Conn.

[73] Assignee: American Cyanimid Company, Stamford, Conn.

[22] Filed: Dec. 17, 1973

[21] Appl. No.: 425,419

[52] U.S. Cl............... 260/33.6 AQ, 260/29.7 GR, 260/29.7 PT, 260/29.7 T, 260/80.7, 260/85.1

[51] Int. Cl............................................. C08d 7/02

[58] Field of Search........... 260/80.7, 85.1, 33.6 AQ

[56] References Cited

UNITED STATES PATENTS 3,761,455   9/1973   Tanaka et al...................... 260/85.1

*Primary Examiner*—Stanford M. Levin
*Attorney, Agent, or Firm*—Frank M. Van Riet

[57] ABSTRACT

Anionic polymers are added to oil-extended, rubber latices in conjunction with cationic polymers and acids in order to coagulate the latex and recover the oil-extended rubber.

6 Claims, No Drawings

COAGULATION OF OIL-EXTENDED EMULSIONS

BACKGROUND OF THE INVENTION

For years, the classical method of coagulating rubber latices, including those which were unpigmented, those which were pigmented such as with carbon black and those which were oil-extended, involved the addition of a strong brine solution thereto. The addition of the brine solution resulted in a "cheesing" effect or partial coagulation of the latex. This partially coagulated latex was then treated with sulfuric acid in the presence of high shear mixing. This method performed well for all the above-mentioned latices including the oil-extended system which is a mixture of about 90 parts of a 20% solids rubber latex and about 10 parts of an oil emulsion of about 65% solids. Most of these latices contain a minute quantity of an antioxidant.

Although the brine process performed well, large quantities of sodium chloride were consumed resulting in an effluent disposal problem. Many commercial rubber manufacturers then replaced the brine treatment with a cationic polyelectrolyte treatment with good results. Many more commercial producers are considering this alternative method at this time.

Although the cationic polyelectrolyte method performs well with regard to most rubber latices, attempts to treat oil-extended latices have not met with much success. The method fails because the coagulation occurs inhomogeneously, even before addition of the acid. The oil separates first and the resultant mass, after acid addition, is extremely tacky and therefore commercially and mechanically unacceptable. Attempts to uncover a suitable cationic polyelectrolyte by evaluating a myriad of existing materials, both alone and in conjunction with the acid, have been unsuccessful.

SUMMARY OF THE INVENTION

We have now discovered a method whereby the coagulation of a rubber oil-extended latex is made to occur in a homogeneous fashion. That is to say, utilizing our novel process, the coagulation of the rubber and the oil used to extend it, occur at substantially identical instances thereby resulting in a one-phase coagulant rather than a two phase system comprising one phase of rubber and a second phase of oil.

This unique result is accomplished by the addition of an anionic polymer to the rubbery, oil-extended latex prior to or during the normal addition of a cationic polymer thereto, followed by an acid treatment.

While not wishing to be bound by any specific theory with regard to what occurs during the anionic polymer addition, we believe that the anionic polymer causes the latex to remain essentially emulsified during the addition of the cationic polymer. As a result, the cationic polyelectrolyte acts upon the entire emulsified composition at substantially the same time thereby coagulating all the coagulatable materials simultaneously i.e. homogeneously, and resulting in an essentially one phase recoverable product.

DESCRIPTION OF THE INVENTION INCLUDING PREFERRED EMBODIMENTS

As mentioned above, we have now discovered that the addition of an anionic polymer to a latex of an oil-extended rubber enables the subsequent or concommitant addition of a cationic polyelectrolyte and acid coagulating agent without a two phase separation of the rubber and the oil.

The addition of the anionic polymer may be conducted prior to or during the normal addition of the cationic polyelectrolyte, it being preferred that the anionic polymer addition be effected first. The anionic polymer addition is preferably effected at room temperature and atmospheric pressure although temperatures ranging from about 10° to about 70°C. and sub or superatmospheric pressures can be used if desired or necessary.

The anionic polymers employed in our novel process should contain from about 5 to 100%, by weight, based on the weight of the polymer, of carboxyl groups, either as free carboxyl or salts thereof such as the alkali salts e.g. sodium, potassium etc. Ammonium salts can also be used. It is preferred that the carboxyl content of the anionic polymer range from about 30 to 100% as this is the most common range of commercially available anionic materials.

The molecular weight of the anionic polymer should range from about 500 to about 15,000,000 as determined from inherent viscosity measurements of the polymers, with molecular weights ranging from about 1,000 to about 1,000,000, being preferred. 15,000,000

The amount of anionic polymer added depends primarily upon the characteristics of the oil-extended rubber which is being coagulated. That is to say, enough anionic polymer must be present to prevent the premature coagulation of the oil from the rubber emulsion and this amount depends entirely upon the system being treated. The only critical feature of the anionic polymer concentration necessary, of course, resides in the minimum amount which will perform this function in that higher quantities of polymer do not further enhance the ability of it to prevent premature coagulation. The minimum amount of anionic polymer necessary can easily be ascertained by the skilled chemist by merely adding increasing amounts of anionic polymer to a series of portions of the oil-extended rubber emulsion charge followed by the cationic polymer and acid additions. That minimum effective amount of anionic polymer which prevents the inhomogeneous coagulation of the oil and the rubber can then be used on the entire batch of latex charge. Amounts ranging from about 0.005 to about 0.25%; by weight, based on the total weight of the rubber and oil in the latex charge, have generally been found effective.

Among the anionic polymers useful in the present invention are those represented by the general formula

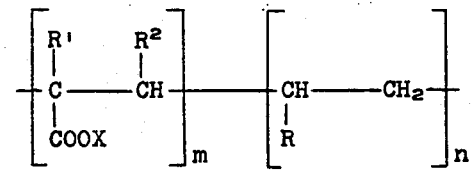

wherein R is phenyl, cyano, carbamoyl, carboxy, lower alkoxy of 1–4 carbon atoms, inclusive, or lower alkanoyloxy of 2–4 carbon atoms, inclusive, R' is hydrogen or methyl, $R^2$ is hydrogen or carboxyl with the proviso that when R' is methyl, $R^2$ is hydrogen, X is hydrogen, $Na^+$, $K^+$ or $NH_4^+$, $n + m$ = about 5 to about 30,000, preferably about 10 to about 2000, the ratio of $m/n$ being from about 100/0 to about 5/95, respectively, i.e. the polymer contains from about 5 to about 100% carboxyl groups, i.e. COOH or COOX. Polyanionic systems with the above general formula fall into two general classes, the first consisting of homopolymers of acrylic acid, methacrylic acid, hydrolyzed maleic anhydride and sodium, potassium and ammonium salts thereof and the second class consisting of copolymers of maleic anhydride, acrylic acid, methyacrylic acid and their salts with comonomers such as styrene, acrylonitrile, acrylamides, acrylic acid, vinyl ethers and vinyl esters, the maleic anhydride copolymers being hydrolyzed. The preferred copolymers are those of salts of acrylic or methacrylic acid and acrylamide. Polymers of this type and methods for their preparation can be found in U.S. Pat. Nos. 2,047,398; 2,286,062; 2,490,489; 2,675,370 and 3,418,237 which patents are hereby incorporated herein by reference. Sulfonated polymers such as sulfonated polystyrene etc. may also be used.

The cationic polymers used after or simultaneously with the treatment of the oil-extended latex with the anionic polymers are well known in the art and generally comprise water-soluble cationic polyelectrolytes i.e. polymers produced from such monomers as the N-substituted-(N'-dialkylaminoalkyl) acrylamides (U.S. Pat. No. 3,171,805) including N-(diethylaminomethyl) acrylamide; aminoalkylacrylates and dialkylaminoalkylacrylates such as dimethylaminopropylacrylate; vinylpyridine; diallylamines such as diallylbenzylamine; quarternaries such as N-methylvinylpyridinium chloride; epichlorohydrin-amine polymers such as taught in U.S. Pat. No. 3,248,353; formaldehyde extended melamin formaldehyde colloids such as set forth in U.S. Pat. Nos. 2,345,543 and 2,986,489; polyamide-polyamines such as disclosed in U.S. Pat. No. 3,329,657; polyamine-polyacrylamide reaction products taught in U.S. Pat. No. 3,503,946; glyoxylated vinylamide polymers such as disclosed in U.S. Pat. No. 3,556,932; epichlorohydrin-methylamine reaction products (U.S Pat. Nos. 3,732,173; 3,567,659) epichlorohydrin-hydrated polyvinylimidazoline reaction products (U.S. Pat. No. 3,640,936); polyvinylamidines (U.S. Pat. No. 3,666,705); polyamidepolyamide-epichlorohydrin reaction products (U.S. Pat. Nos. 2,926,116; 3,733,290); dialkylamine-difunctional epoxy and dialkylamine-polyamine-difunctional epoxy reaction products (U.S. Pat. No. 3,738,945) and the like, said patents hereby being incorporated herein by reference.

The conditions under which the anionic polymer containing latex is contacted with the cationic polymer and acid are well known to those skilled in the art. Temperatures and pressures within the ranges specified above for the anionic polymer addition are generally employed. The cationic polymer concentration is not critical except that sufficient amounts thereof so as to cause coagulation of the oil-extended rubber latex must be employed. Typical amounts range from 0.01to 10.0% by weight, based on the weight of the resin solids and oil Sulfuric acid is the acid preferred for the third step of the instant process although other acids such as hydrochloric, nitric etc. can also be used. Sufficient amounts so as to complete the rubber-oil coagulation are typical.

Recovery of the oil-extended butadiene-styrene rubber is effected by filtration, centrifugation etc. in a known manner.

The rubber latices which are treated according to our novel process are generally composed of copolymers and terpolymers of styrene, butadiene and acrylonitrile. These rubbery polymers are well known to those skilled in the art and generally comprise from about 3-75% styrene, from about 25-97% butadiene and from about 0-50% acrylontrile, said percentages being by weight, based on the total weight of the rubber, the sum of the concentrations of each component totaling 100%. The rubbery copolymer latices are present as aqueous emulsion, the polymeric rubber being present in amounts up to about 90% resin solids, preferably 10-80%, the emulsifer generally comprising an oleate or rosin soap.

The oil used to extend these polymeric rubbers usually is a mineral oil fraction boiling within the range of 100°F.-300°F. The oil is generally incorporated as an aqueous emulsion (65% oil is typical) in amounts ranging from about 2-40% by weight, based on the total weight of the rubber solids. From about 5% to about 20%, by weight, same basis, of oil is preferred.

The following examples are set forth for purposes of illustration only and are not to be construed as limitations on the present invention except as set forth in the appended claims. All parts and percentages are by weight unless otherwise specified.

EXAMPLE 1

To a suitable vessel containing 200 ml of a 20% solids SBR (styrene 20/butadiene 80) latex and 20 ml of a 65% aqueous oil emulsion added at room temperature 1.5 ml of a 1% aqueous solution of a commercially available lower molecular weight (3–5000) polyacrylic acid, 80–90% of the available hydroxyl groups thereof being present as the sodium salt thereof. The emulsion is stirred and 15 ml of a commercially available, low molecular weight cationic acid colloid of a melamine/-formaldehyde resin of the type disclosed in U.S. Pat. No. 2,986,489. Curdling occurs immediately but no oil separation can be visually detected. Addition of 6.5 ml of 10% sulfuric acid results in a homogeneous coagulum with good dewatering characteristics.

EXAMPLE 2 (Comparative)

The procedure of Example 1 is again followed except that the anionic polymer is omitted. Upon addition of the cationic polymer, beads of oil are visually apparent and addition of the sulfuric acid results in the formation of a tacky coagulated mass.

EXAMPLES 3–10

The procedure of Example 1 is again followed except that the anionic and cationic polymeric materials employed are varied. In each instance, a homogeneous coagulum free of tackiness and of good dewatering ability is recovered. The polymers employed are set forth in Table I, below. Hydrochloric acid is used in Example 5 and nitric acid in Example 9. The rubber charge of Example 3 is 40% styrene, 30% butadiene and 30% acrylonitrile while that of Example 8 is 60% butadiene, 25% acrylonitrile and 15% styrene.

TABLE I

| EX. | ANIONIC POLYMER | CATIONIC POLYMER |
| --- | --- | --- |
| 3 | Hydrolyzed 1:1 copolymer of styrene and maleic anhydride of 500,000 molecular weight | Melamine-formaldehyde colloid of U.S. 2,986,489 |
| 4 | Polymethacrylic acid of molecular weight of 10,000 | Methyl amine-epichlorohydrin reaction product of U.S. 3,732,173 |
| 5 | Poly(acrylic acid-acrylamide) (60:40 mol ratio-molecular weight 500 | Polyamidepolyamine-epichlorohydrin reaction product of U.S. 3,733,290 |
| 6 | Poly(acrylic acid-maleic acid)-1:1 ratio-molecular weight 500,000-hydrolyzed-potassium salt | Copolymer of acrylamide and diallylmethylamine (80:20) |
| 7 | Styrene-maleic acid copolymer-ratio 1:1-molecular weight 30,000- linkages as per hydrolyzed | Polymer of ethylenevinylamidine (2-vinylimidazoline) U.S. 3,666,705 |
| 8 | Vinylmethylether-maleic acid copolymer-ratio 1:1-molecular weight 1,000,000-hydrolyzed | Dialkylaminoalkyl polyacrylamide material of U.S. 3,503,946 |
| 9 | Homopolymer of sodium salt of methacrylic acid-molecular weight of 15,000 | Dimethylamine-ethylenediamine-epichlorohydrin product of Example 3 of U.S. 3,738,945 |
| 10 | Acrylic acid-vinyl acetate (5/95) copolymer molecular weight-8,000,000 | Dimethylamine-epichlorohydrin product of Example 1 of U.S. 3,738,945 |

We claim:

1. A method for coagulating an oil extended, rubber latex of 3-75% styrene, 25-97% butadiene and up to 50% acrylonitrile, the total being 100%, said percentages being by weight which comprises
   1. adding to said latex an anionic polymer having a molecular weight of from about 500 to 15,000,000 and containing from about 5 to 100% by weight of carboxyl groups,
   2. adding to the product of step (1), a cationic polymer,
   3. adding to the product of step (2), an acid and
   4. recovering the resultant coagulated oil-extended rubber.

2. A method according to claim 1 wherein said cationic polymer is a melamine-formaldehyde resin acid colloid.

3. A method according to claim 1 wherein said anionic polymer is a polymer of acrylic acid.

4. A method according to claim 1 wherein said anionic polymer is a polymer of a salt of acrylic acid.

5. A method according to claim 1 wherein said cationic polymer is a dialkylamine-difunctional epoxy reaction product.

6. A method according to claim 1 wherein said cationic polymer is a dialkylamine-polyamine-difunctional epoxy reaction product.

* * * * *

UNITED STATES PATENT OFFICE
CERTIFICATE OF CORRECTION

Patent No. 3,875,104　　　　　　　Dated April 1, 1975

Inventor(s) FREDERICK H. SIEGELE and ROBERT RABINOWITZ

It is certified that error appears in the above-identified patent and that said Letters Patent are hereby corrected as shown below:

[73] Assignee: Change "Cyanimid" to -- Cyanamid --.

Col. 2, line 24.　After "preferred." delete -- 15,000,000 --.
Col. 2, line 68.　After "5" insert -- % --.

Col. 3, line 43.　Change "polyamidepolyamide" to
                    -- polyamidepolyamine --.
Col. 3, line 57.　After "0.01" insert -- % --.
Col. 3, line 59.　After "oil" add -- . --.

Col. 5, Example 7.　Under heading ANIONIC POLYMER delete
                "line) linkages as per".
Col. 5, Example 7.　Under heading CATIONIC POLYMER add
                -- line) linkages as per --.
Col. 5, line 39.　After "weight" add -- , --.

Signed and Sealed this thirtieth Day of September 1975

[SEAL]

Attest:

RUTH C. MASON
Attesting Officer

C. MARSHALL DANN
Commissioner of Patents and Trademarks